(12) United States Patent
Bedel

(10) Patent No.: US 8,402,873 B2
(45) Date of Patent: Mar. 26, 2013

(54) PALLET DISMANTLER

(76) Inventor: Ambrose Bedel, Greensburg, IN (US)

( * ) Notice: Subject to any disclaimer, the term of this patent is extended or adjusted under 35 U.S.C. 154(b) by 554 days.

(21) Appl. No.: 12/638,096

(22) Filed: Dec. 15, 2009

(65) Prior Publication Data

US 2011/0138984 A1    Jun. 16, 2011

(51) Int. Cl.
*B23D 55/10* (2006.01)
*B23D 55/00* (2006.01)

(52) U.S. Cl. ............................. 83/817; 83/814

(58) Field of Classification Search .............. 83/788, 83/810–818, 820; 30/380
See application file for complete search history.

(56) References Cited

U.S. PATENT DOCUMENTS

| | | | | | |
|---|---|---|---|---|---|
| 120,949 | A | * | 11/1871 | Doane et al. | 83/817 |
| 384,252 | A | * | 6/1888 | Gillis | 83/818 |
| 588,653 | A | * | 8/1897 | Pelton | 83/818 |
| 716,169 | A | * | 12/1902 | Barker | 83/816 |
| 919,128 | A | * | 4/1909 | Cleveland | 83/818 |
| 920,035 | A | * | 4/1909 | Dittbenner | 83/818 |
| 928,211 | A | * | 7/1909 | McDonough | 83/818 |
| 1,567,911 | A | * | 12/1925 | Campbell | 83/818 |
| 1,571,972 | A | * | 2/1926 | Schettler | 83/816 |
| 1,591,247 | A | * | 7/1926 | Tannewitz | 83/815 |
| 1,745,959 | A | * | 2/1930 | Steiner | 92/44 |
| 2,081,033 | A | * | 5/1937 | Biro | 83/817 |
| 2,205,527 | A | * | 6/1940 | Hartman | 83/807 |
| 2,640,304 | A | * | 6/1953 | McEwan | 451/311 |
| 3,374,812 | A | * | 3/1968 | McManama | 83/466 |
| 3,658,102 | A | * | 4/1972 | Joosten | 30/373 |
| 4,321,849 | A | * | 3/1982 | Athey et al. | 83/816 |
| 4,356,750 | A | * | 11/1982 | Legler et al. | 83/816 |
| 5,203,247 | A | * | 4/1993 | D'Arcy | 83/794 |
| 2004/0168555 | A1 | * | 9/2004 | Donovan et al. | 83/13 |

* cited by examiner

*Primary Examiner* — Laura M. Lee
(74) *Attorney, Agent, or Firm* — James A. Italia; Italia IP

(57) ABSTRACT

A pallet dismantler includes a frame, a first drive roller rotatably coupled to the frame, and an arm pivotably coupled to the frame. A sleeve member is rigidly coupled to the arm. An axle extends from the sleeve. A second drive roller is rotatably coupled to the axle. An adjustable ratchet member extends between the arm and the frame. The adjustable ratchet member is operable to adjust the position of the second driver roller relative to the first drive roller. A blade member is trained on the first and second drive rollers.

10 Claims, 6 Drawing Sheets

PALLET DISMANTLER

BACKGROUND OF INVENTION

The present application relates generally to the field of band saws and more specifically, those saws used to sever runners or stringers from deck boards of a pallet or skid.

SUMMARY

Pallets or skids often become damaged over time. It is frequently desirable to dismantle, either partially or completely, pallets or skids for the purposes of repair or recycling. Horizontally oriented band saws are frequently employed to dismantle such pallets or skids. While effective, setting up these band saws is time consuming as it requires a lot of trial-and-error to have the blade appropriately tightened and/or positioned between the drive rollers. Moreover, the use of such band saws is also time consuming as adjusting the height of pallet support or table is highly inefficient and passing the pallet or skid through the blade frequently requires removing the pallet or skid from the support or table several times. Therefore, there exists a significant need for an improved device or dismantling pallets or skids.

In particular, this application discloses a pallet dismantler comprising: a frame; a first drive roller rotatably coupled to the frame; an arm pivotably coupled to the frame; a sleeve member rigidly coupled to the arm; an axle extending from the sleeve; a second drive roller rotatably coupled to the axle; an adjustable ratchet member extending between the arm and the frame, the adjustable ratchet member operable to adjust the position of the second driver roller relative to the first drive roller; and a blade member trained on the first and second drive rollers.

This application also discloses a pallet dismantler comprising: a first drive roller; a second drive roller; a blade member trained on the first and second drive rollers; a platform member for supporting a pallet thereon, the platform member movable between a first and second position; and a lift mechanism configured to move the platform member between the first and second positions, the lift mechanism comprising: an air bag member, wherein inflation of the air bag causes the platform member to move to the platform member second position, and wherein deflation of the air bag causes the platform member to move to the platform member first position.

This application further discloses a drive roller assembly comprising: a frame; an arm pivotably coupled to the frame; a sleeve member rigidly coupled to the arm; an axle extending from the sleeve; a drive roller rotatably coupled to the axle; and an adjustable ratchet member extending between the arm and the frame, the adjustable ratchet member operable to selectively adjust the position of the arm relative to the frame.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
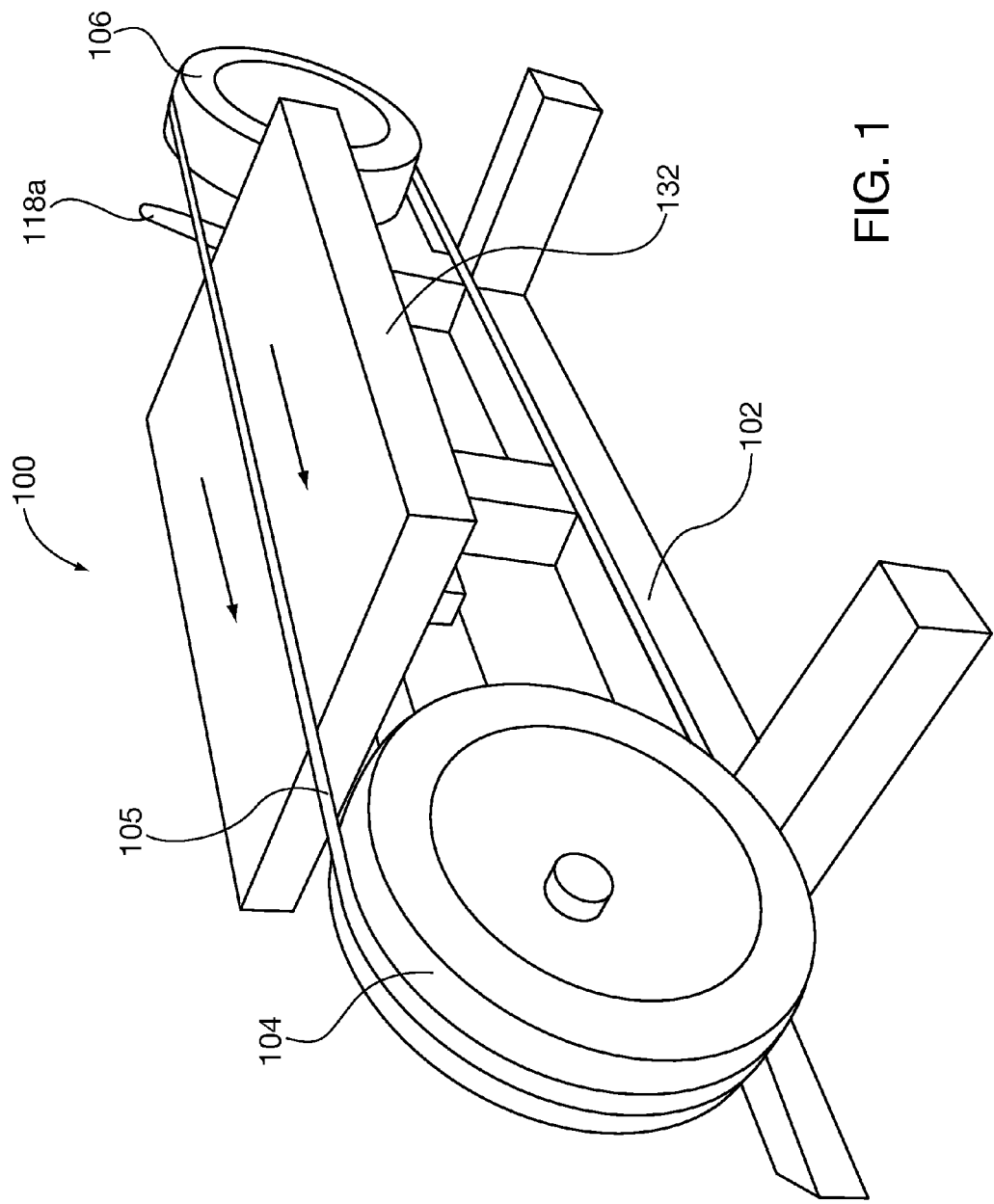
FIG. 1 is a schematic perspective view of a pallet dismantler.
Figure 2A:
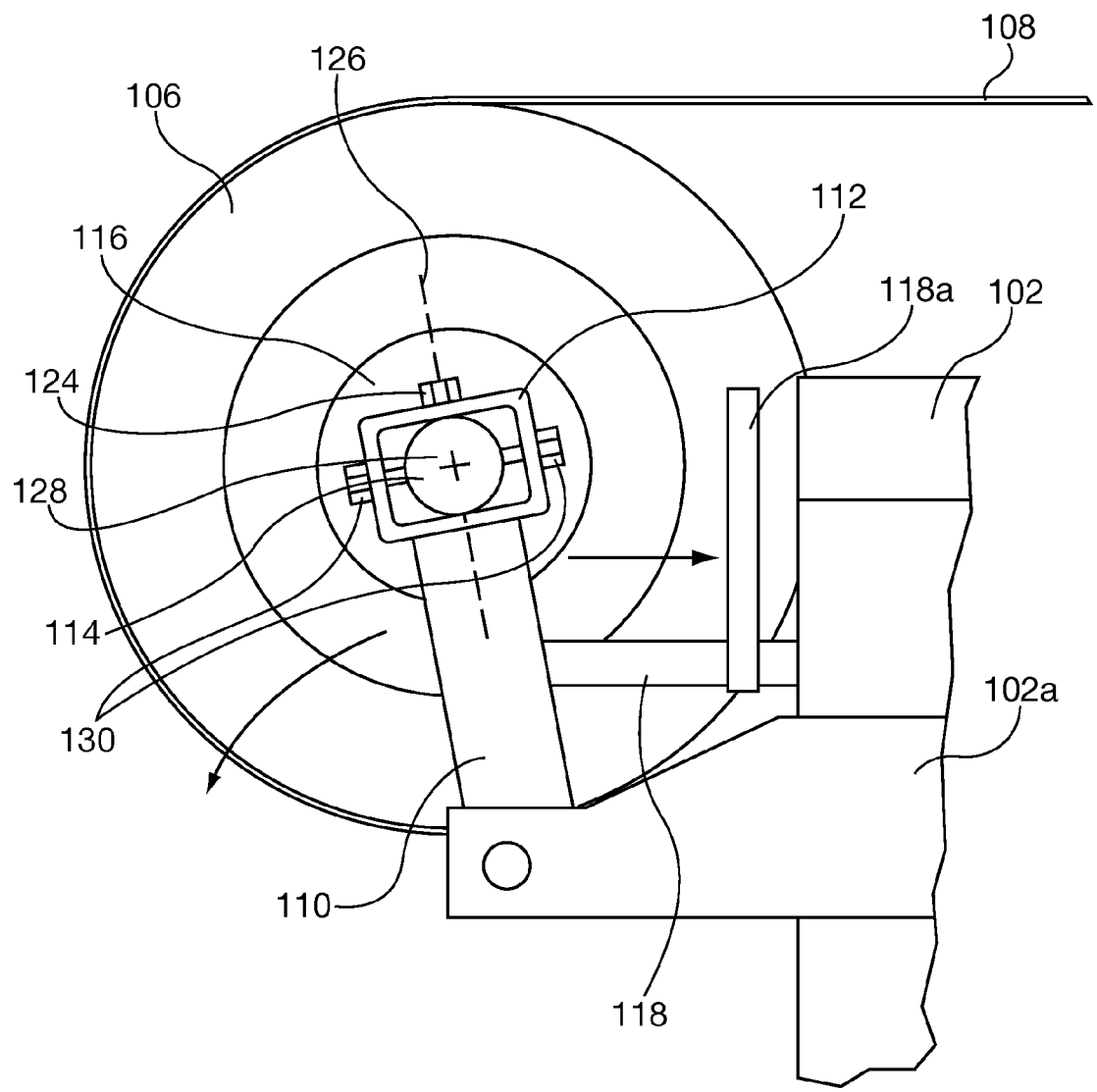
FIG. 2A is a schematic side view of a drive roller assembly of the pallet dismantler of FIG. 1.
Figure 2B:
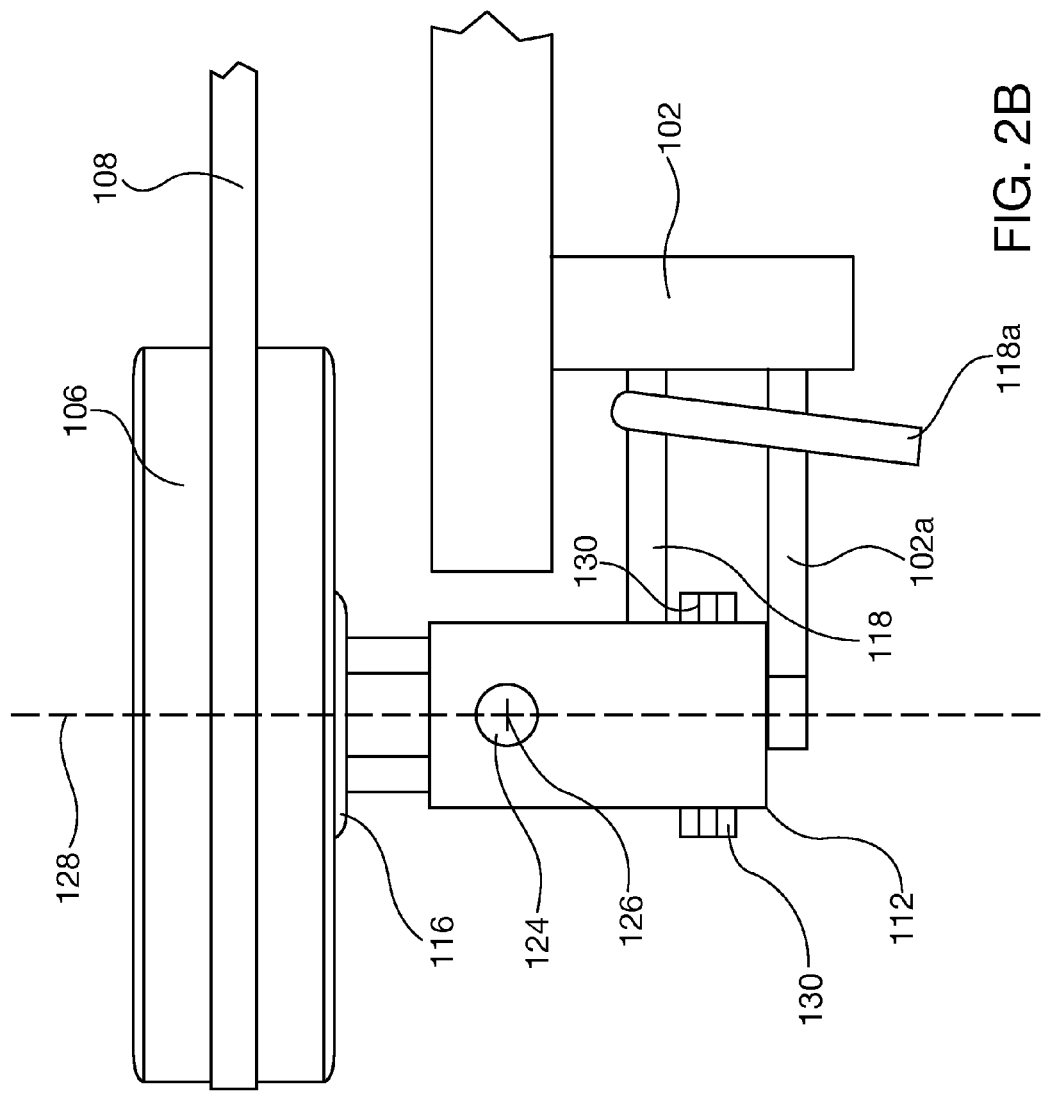
FIG. 2B is a schematic top view of the drive roller assembly of FIG. 2A.
Figure 3:
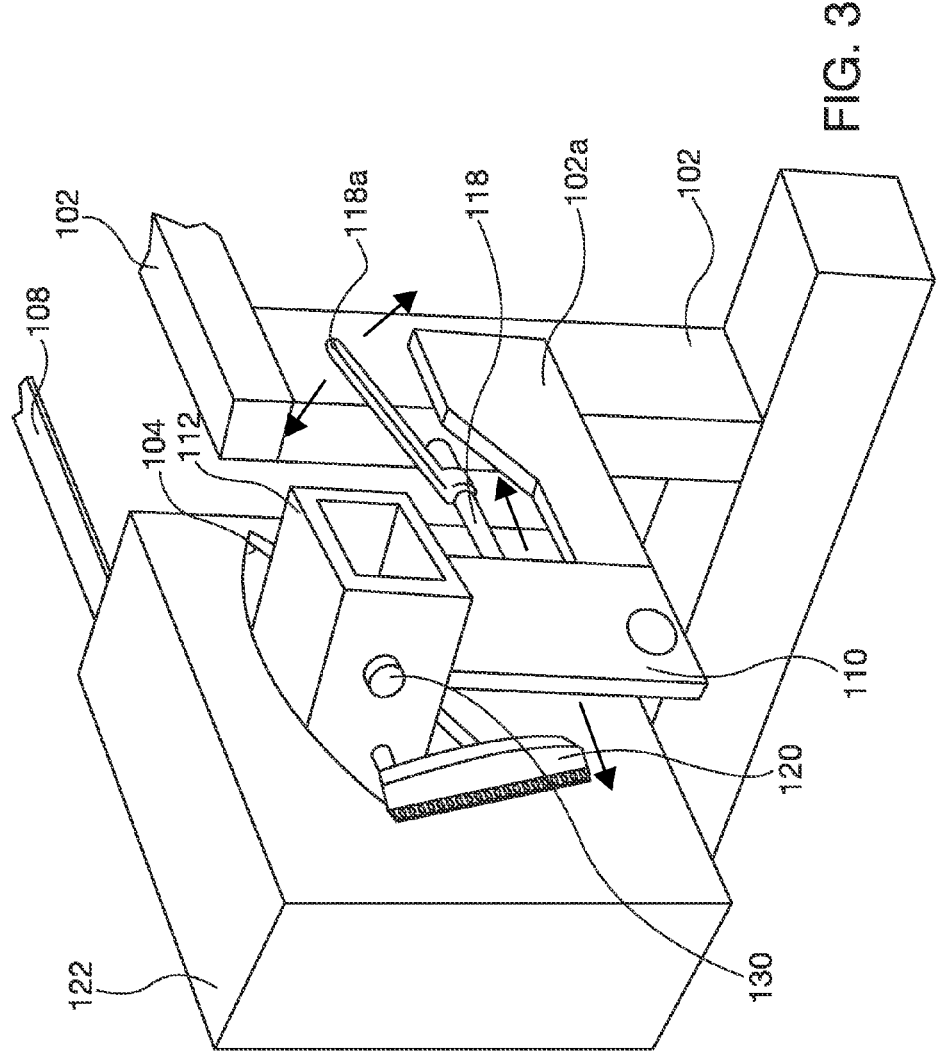
FIG. 3 is a schematic perspective view of a drive roller assembly.

Referring now to FIGS. 1-3, an illustrative pallet dismantler 100 is shown. The dismantler 100 includes a frame 102, a first drive roller 104 and a second drive roller 106. The first drive roller 104 is rotatably coupled to the frame 102 as is known in the art and driven by any suitable driving mechanism also as known in the art. A blade member 108 for cutting pallets is trained between the first drive roller 104 and second drive roller 106.

In one embodiment, the frame 102 includes an extension 102a. An arm 110 may be pivotably coupled to the frame extension 102a. While a frame extension 102a is used in the illustrative embodiment, it will be appreciated that the arm 110 may be pivotably coupled to any suitable portion of the frame 102. A sleeve member 112 is coupled to the arm 110. An axle 114 extends from within the sleeve member 112 and is rotatably coupled to the second drive roller 106 via a bearing 116 or any other suitable device for permitting the second drive roller 106 to rotate on the axle 114.

A ratchet member 118 extends between the frame 102 and arm 110 whereby a user may selectively cause the arm 110 to pivot thereby adjusting the position of the second drive roller 106 relative to the first drive roller 104 such that the blade member 108 may be loosened for removal or replacement (by pivoting the second drive roller 106 towards the first drive roller 104) or the blade member 108 made taught between the drive rollers 104, 106 (by pivoting the second drive roller 106 away from the first drive roller 104). In the illustrative embodiment, the ratchet member 118 includes a handle 118a so that a user may adjust the ratchet member 118; however, it will be appreciated that the ratchet member 118 may be adjusted by any suitable means and remain within the scope of the present disclosure.

In one embodiment, as best shown in FIG. 3, a stop 120 may be employed to limit the pivotal movement of the arm 110 so that, for example, the blade member 108 is not over tightened and/or fractured by pivotal movement of the arm 110 away from the first drive roller 104. In one embodiment, the stop 120 is coupled to a cowl member 122 disposed about the second drive roller 106. The cowl member 122 may include an aperture 124 for permitting the sleeve member 112 to extend therethrough whereby the stop 120 may engage the sleeve member 112 to prevent the arm 110 from pivoting any further away from the first drive roller 104. While the stop 120 is coupled to a cowl member 122 in the illustrative embodiment, it will be appreciated that the stop 120 may be coupled to the frame 102 or any other suitable device or member and remain within the scope of the present disclosure or that the dismantler 100 may employ any suitable means or device for limiting pivotal movement of the arm 110 and remain within the scope of the present disclosure.

Further, in one embodiment, the axle 114 is pivotably coupled to the sleeve member 112. In one non-limiting example, a bolt 124 extends through the sleeve member 112 and axle 114 so as to provide an axis 126 for the axle 114 to pivot about. In one embodiment, the axle pivot axis 126 is substantially perpendicular to the longitudinal axis 128 of the axle 114. One or more biasing member 130 pass through the sleeve member 112 and abut the axle 114. The biasing members 130 may be selectively adjusted by a user to pivot the axle 114 about the axle pivot axis 126 such that the position of the second drive roller 106 may be adjusted relative to the first drive roller 104. The use of the biasing members 130 to adjust the position of the second drive roller 106 relative to the first drive roller 104 may advantageously correct misalignment in cases where the blade member 108 is being moved off of the rollers 104, 106 when the rollers are being driven by the drive mechanism. In one embodiment, the biasing members 130 are bolts, however, it will be appreciated that any suitable means or device for pivoting the axle 114 within the sleeve member 112 about the pivot axis 126 to correct misalignment between the first drive roller 104 and second drive roller 106 may be employed and remain within the scope of the present disclosure.

Figure 4:
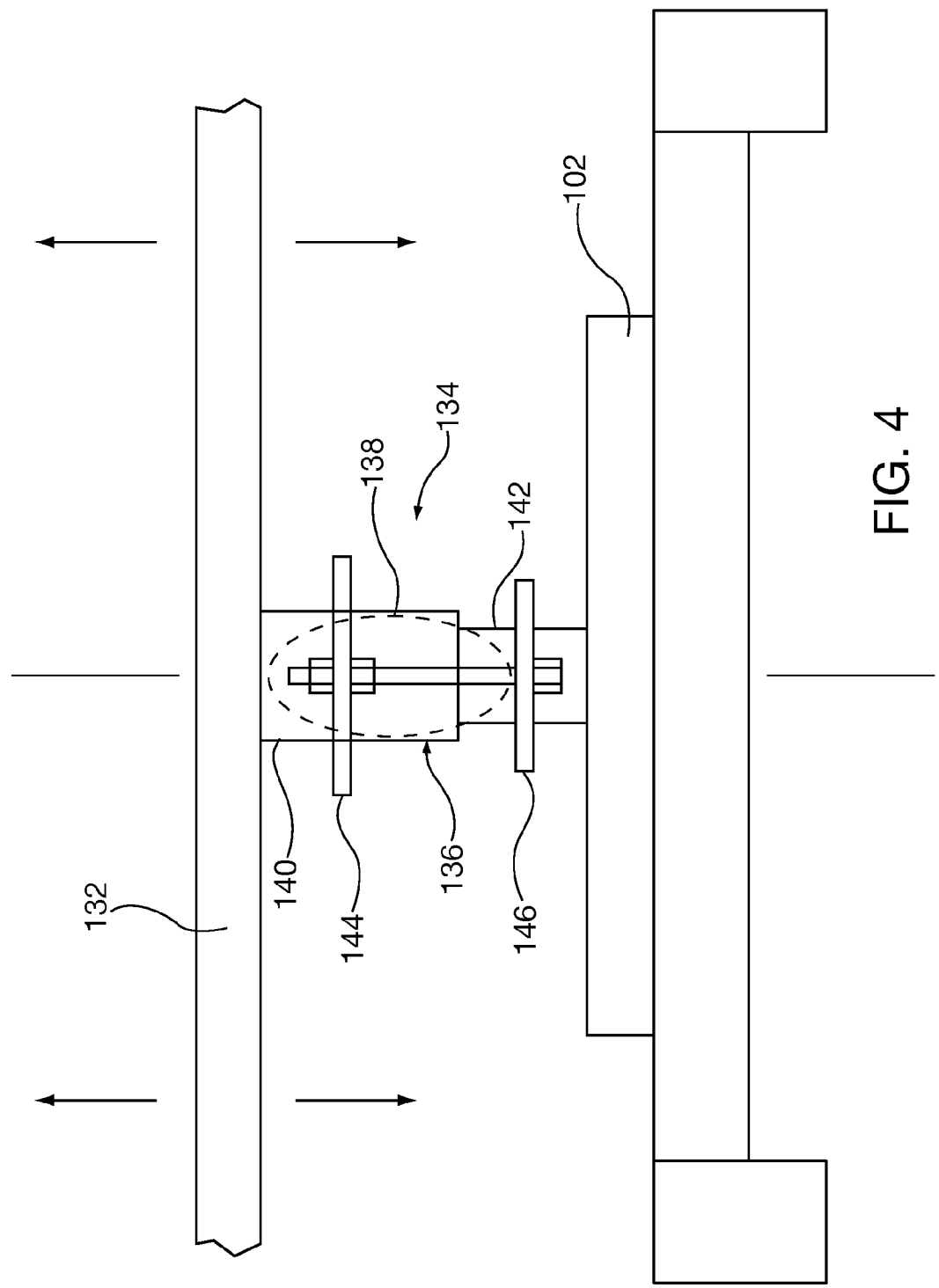
FIG. 4 is a schematic partial side view of a pallet dismantler employing a lift mechanism.

Referring now to FIGS. 1 and 4, the dismantler 100 may include a platform member 132 for supporting a pallet thereon. The platform member 132 may be movable between a first position and a second position. The dismantler 100 may include a lift mechanism 134 configured to move the platform member 132 between the first platform member position and the second platform member position. In the illustrative embodiment, the lift member 134 includes a cylinder assembly 136 and an air bag 138. The cylinder assembly 136 includes an upper cylinder 140 coupled to the platform member 132, and a lower cylinder 142 in telescopic engagement with the upper cylinder 140. The air bag 138 may be disposed within the cylinder assembly 136 and in at least one of the upper cylinder 140 and lower cylinder 142. The air bag 138 is configured such that inflation of the air bag 138 causes the platform member 132 to move to the platform member second position and deflation of the air bag causes the platform member 132 to move to the platform member first position. The air bag 138 may be in fluid communication with and be inflated and/or deflated via and suitable pump device or means. The lift member 134 may include at least one of an upper stop 144 and a lower stop 146 to limit movement of the platform member 132.

Figure 5:
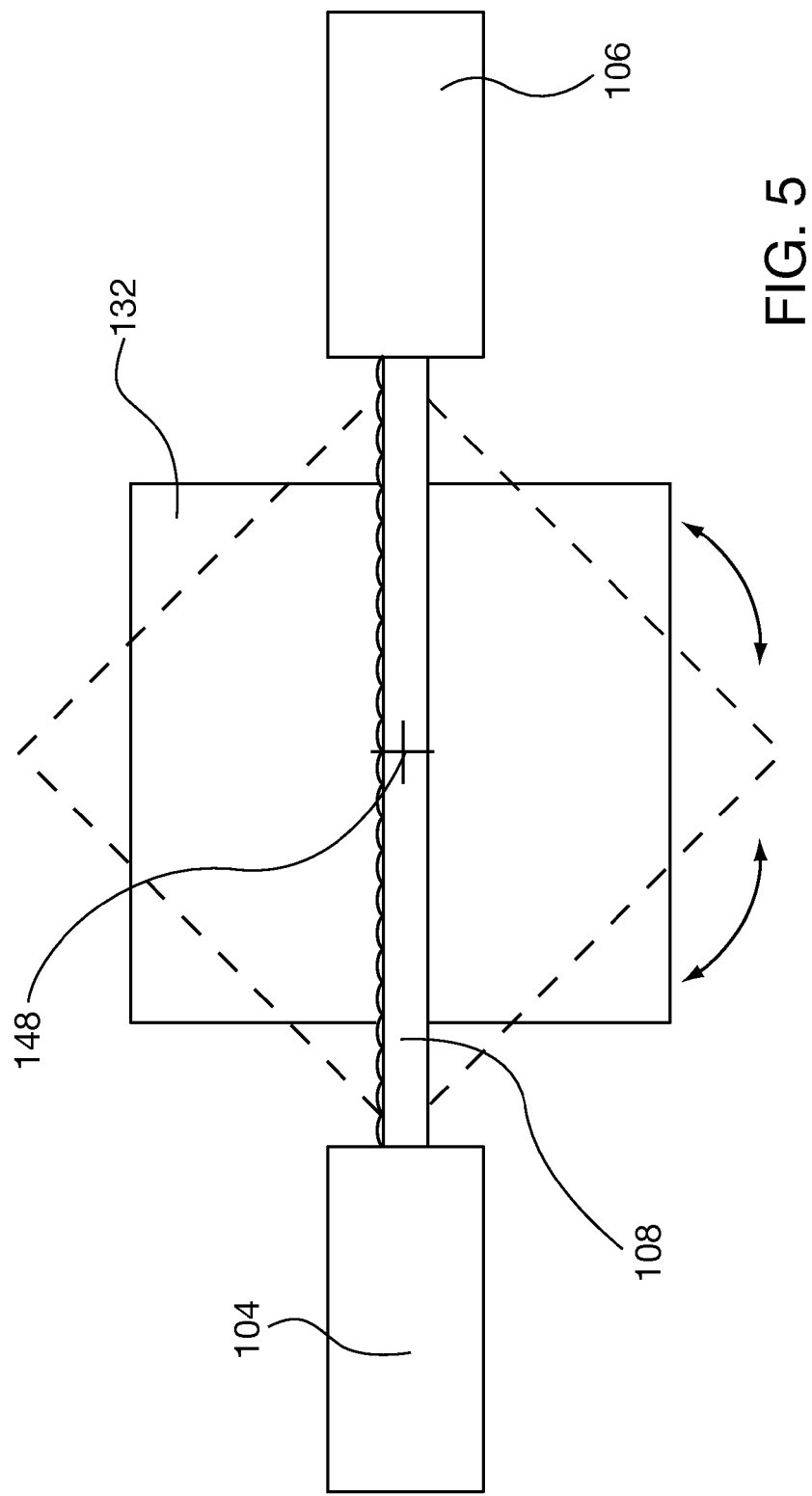
FIG. 5 is a schematic top view of a pallet dismantler.

Referring now to FIG. 5, in one embodiment, the platform member 132 is pivotably coupled to the frame. The platform member 132 may be configured to pivot about an axis 148 such that a user may pivot, either manually or through the use of a drive mechanism, the platform member 132 to direct a pallet on the platform member 132 into the blade member 108 for dismantling.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A pallet dismantler comprising:
   a frame;
   a first drive roller rotatably coupled to the frame;
   an arm pivotably coupled to the frame;
   a sleeve member rigidly coupled to the arm;
   an axle extending from the sleeve, the axle having an axis of rotation, and wherein the axle is pivotably coupled to the sleeve member such that the axle is capable of being pivoted within the sleeve member about an axis substantially perpendicular to the axle axis of rotation;
   a second drive roller rotatably coupled to the axle;
   an adjustable ratchet member extending between the arm and the frame, the adjustable ratchet member operable to adjust the position of the second driver roller relative to the first drive roller; and
   a blade member trained on the first and second drive rollers for cutting the pallets;
   an adjustable ratchet member having a first end and an opposite end extending between and attached to the arm and the frame respectively;
   the adjustable ratchet member operable to pivot the arm and second drive roller to adjust the position of the second drive roller relative to the first drive roller and the tension of the blade member against the first and second drive rollers.

2. The pallet dismantler of claim 1 further comprising at least one biasing member for selectively pivoting the axle within the sleeve member.

3. The pallet dismantler of claim 1 further comprising a platform member for supporting a pallet thereon, the platform member positioned between the first and second drive rollers.

4. The pallet dismantler of claim 3 wherein the platform is selectively movable between a first position and a second position.

5. The pallet dismantler of claim 4 further comprising an air bag wherein inflation and deflation of the air bag cause the platform member to move between the first and second positions.

6. The pallet dismantler of claim 5 wherein the air bag is disposed within a telescoping cylinder assembly.

7. The pallet dismantler of claim 1 wherein the platform member is rotatable about a substantially vertical axis.

8. The pallet dismantler of claim 1 further comprising a stop for limiting pivotal movement of the arm.

9. The pallet dismantler of claim 8 wherein the stop is coupled to a cowl member secured to the frame.

10. The pallet dismantler of claim 8 wherein the stop is coupled to the frame.

* * * * *